March 29, 1927.  1,622,955
J. A. MALM
OIL CLUTCH
Original Filed May 31, 1921   2 Sheets-Sheet 1

Inventor
JOHN A. MALM
By A. J. O'Brien
Attorney

March 29, 1927.
J. A. MALM
OIL CLUTCH
Original Filed May 31, 1921  2 Sheets-Sheet 2
1,622,955
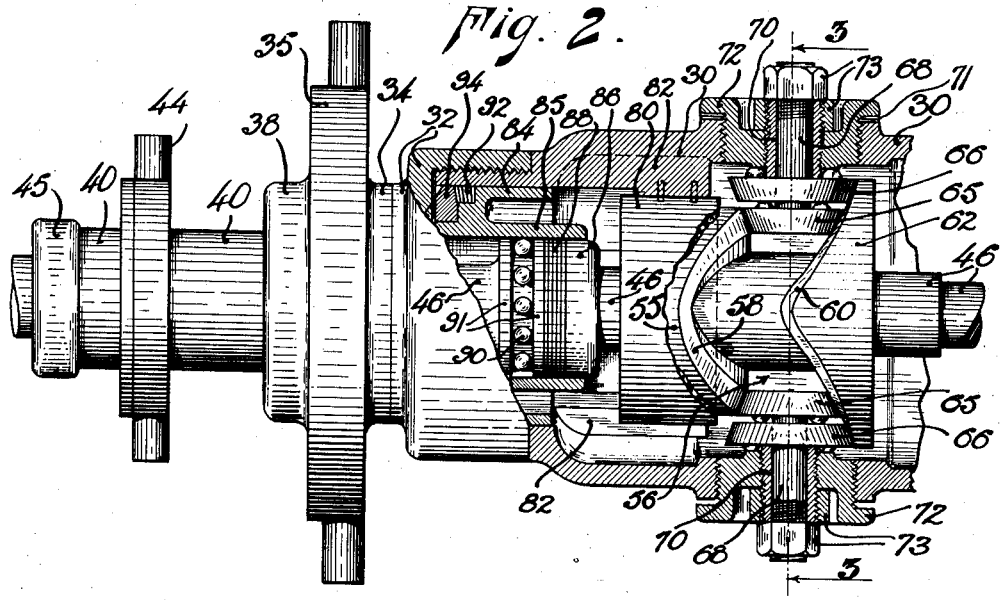
Fig. 2.
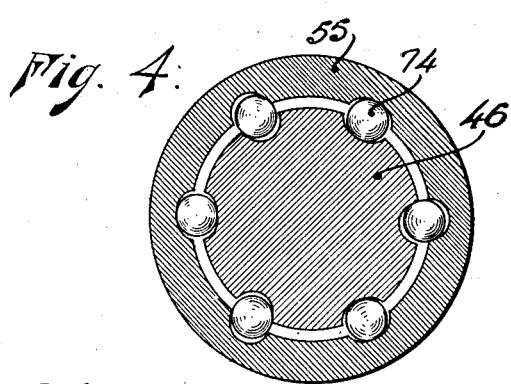
Fig. 4.
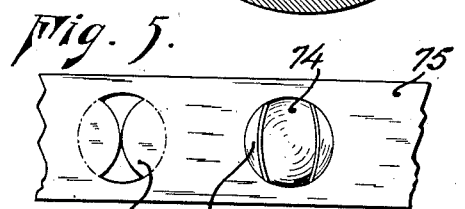
Fig. 5.
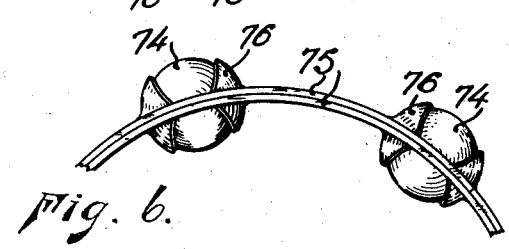
Fig. 6.
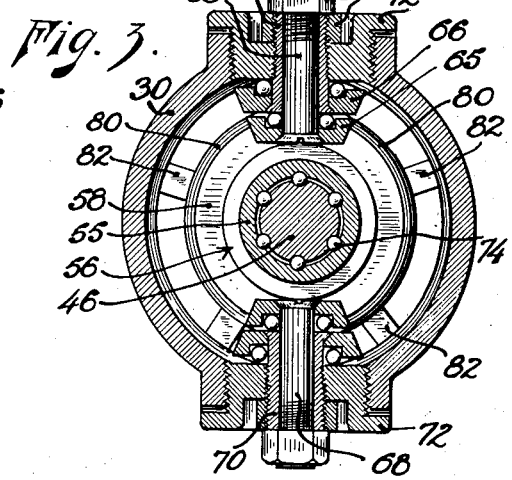
Fig. 3.
Inventor
JOHN A. MALM.
By
Attorney Patented Mar. 29, 1927.

1,622,955

UNITED STATES PATENT OFFICE.

JOHN A. MALM, OF DENVER, COLORADO.

OIL CLUTCH.

Application filed May 31, 1921, Serial No. 474,007. Renewed August 30, 1926.

The object of this invention is to provide an oil clutch to be used in variable speed power transmission which shall be highly efficient, positive in operation and thoroughly durable.

Briefly, the invention comprises a casing to which a shaft is connected in driving relation and into which another shaft extends, the shaft within the casing having a reciprocable piston thereupon whose reciprocation is determined by means of a cam groove having engaging walls on opposite sides, the wall on one side being higher than that on the other and a pair of rollers being provided, one for engagement with the lower cam wall and one for engagement with the higher cam wall. A short cylinder is provided which is secured to the casing and in which one end of the piston reciprocates. The liquid is adapted to move from one end of the piston to the other around the outer face of said cylinder and a valve slidable upon the shaft which carries the piston, cooperates with said cylinder to control the passage of oil from one end of the piston to the other. Means is also provided for taking care of the expansion of the oil or other liquid under temperature changes. A stationary brake member is conveniently provided, adapted to cooperate with the clutch member which is slidable on the drive shaft in order that the stationary member may be used as a brake when the shaft member is brought into engagement therewith. The clutch member on the shaft also serves to engage with the engine clutch in the usual manner. Another feature resides in the employment of balls for splining the piston on the shaft and a novel retainer for said balls.

In the drawings:

Fig. 2 is a view showing the casing partly in elevation and partly in vertical section, and showing the piston and associated parts in elevation.

Fig. 3 is a cross section taken on the line 3—3 of Fig. 2.

Fig. 4 is an enlarged sectional detail showing the arrangement of the ball bearings which also serve as splines.

Fig. 5 is a detail plan, and

Fig. 6 is a detail elevation of the means for retaining the splining balls in proper relation to one another.

Figure 1:
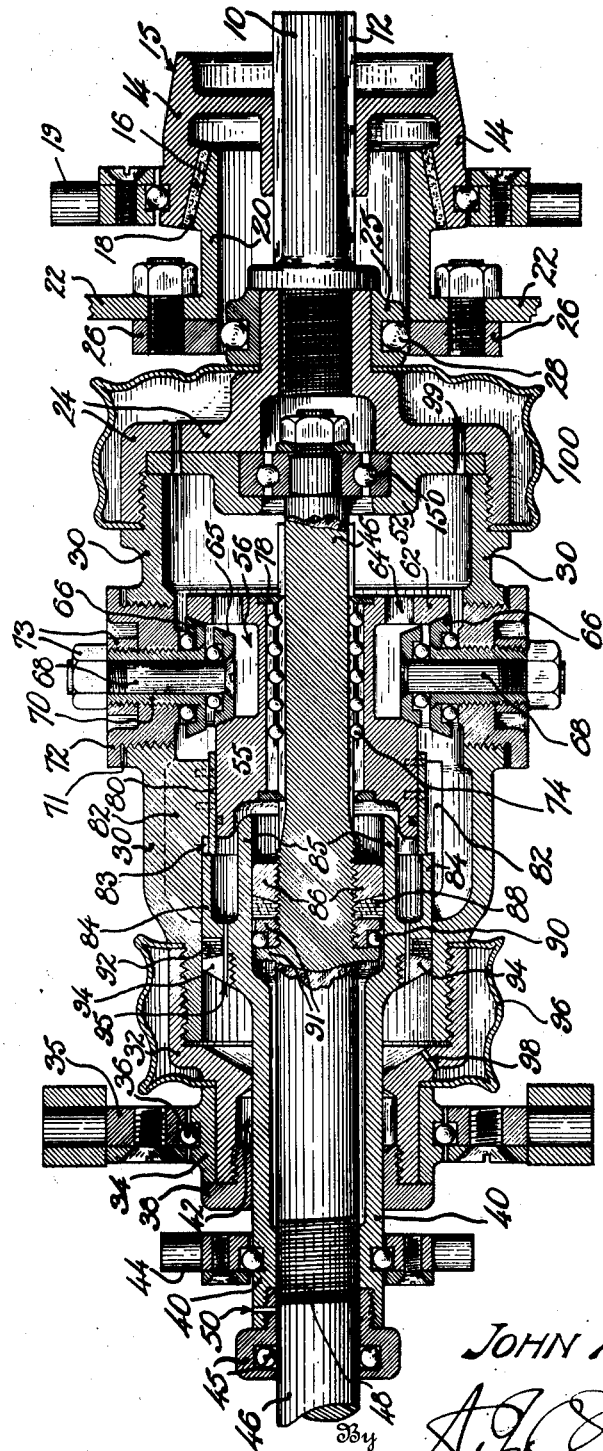
Fig. 1 is a longitudinal section through the clutch of the present invention.

A drive shaft 10 has a clutch member 14 splined thereon as indicated at 12, said clutch member having a conical face 15 adapted to cooperate with the clutch member on an engine shaft. Said member 14 also is provided with an inner conical clutch face 16 adapted to cooperate with a face 18 on a fixed brake member 20 carried by a fixed portion 22 of the stationary framework. The clutch member 14 is movable by means of a yoke 19. By withdrawing the clutch 14 from engagement with the engine shaft and moving its face 16 into engagement with the fixed brake member 20, said brake member 20 will serve as a brake.

The shaft 10 is secured to a head 24 having a bearing 25 journaled in a fixed bearing member 26 on the framework 22 by means of balls 28, for instance. The head 24 is threaded on to a bodily rotatable casing 30 which carries at its other end a second head 32 having a bearing 34 journaled in a fixed bearing 35 by means of balls 36. A packing nut 38 is threaded into the head 32 to retain the bearing 34 and to receive a valve sleeve 40 which is slidable therein. Said packing nut 38 contains packing material within the space 42 between the head 32 and the sleeve 40. Said sleeve 40 has a yoke 44 suitably mounted thereupon for reciprocation of said sleeve.

Bearings 45 are secured to the outer end of the sleeve 40 for the reception of the driven shaft 46 which is threaded for a short distance within the sleeve 40 for the return of oil to the interior, a vent 50 being provided beyond the threads 48 for the escape of excess oil. The inner end of the driven shaft 46 is journaled by means of bearings 150 in a bearing block 52 which is secured against the end of the casing 30 by means of the head 24.

A piston 55 is mounted upon the inner end of shaft 46 and is provided with a cam groove 56 which has on one side a low cam wall 58 and on the opposite side a higher cam wall 60, said cam wall 60 being carried by an elevated annular extension 62 through which longitudinally disposed openings 64 extend for free movement of the oil or other liquid. The casing 30 carries a plurality of pairs or rollers 65 and 66, the inner roller 65 being smaller and traveling along the face 58 and out of engagement with the face 60 and extension 62. The outer roller 66 is larger and travels along the cam face 60 and out of engagement with face 58. Both rollers work against ball bearings as shown. The small inner roller 65 is carried upon a stem 68 which passes through a sleeve 70 carrying the roller 66 and threaded into a nut 72 which is in turn threaded into casing 30. The position of the nut 72 is adjusted by means of shims 71, and the sleeve 70 and stem 68 are adjusted by means of nuts 73 threaded thereonto, said nuts 73 and sleeves 70 serving to lock one another.

The piston 55 is splined on the driven shaft 46 by means of ball bearings 74, of which preferably six rows are provided as seen in Figs. 3 and 4. The grooves in the shaft 46 and piston 55 are so arranged and constructed that three alternate rows of balls 74 support the load and contact with the shaft 46 and piston 55 at points in line with the axis of shaft 46. The grooves which retain the other three rows of balls are so arranged that the balls engage adjacent the edges of the grooves for driving purposes all as shown in Fig. 4. By this construction certain balls serve principally to support the load and others principally to transmit power. In other words, certain balls take care of radial loads and others, alternating therewith, take care of twisting loads. The balls 74 are carried by special retainers 75 which may conveniently be produced by punching from thin sections of tubing, this punching producing oppositely disposed retaining flanges 76, two pieces of tubing oppositely punched being required to retain the balls as illustrated in Fig. 6. In this manner the balls of each longitudinal row are retained in spaced relation in the respective groove, the tubing being positioned obviously between the shaft 46 and the piston 55. The opposite ends of the piston 55 are provided with special flanges 78 having fingers which project inward into the grooves in the shaft 46 and thereby substantially close the same to prevent movement of oil from one end of the piston to the other through said grooves and around the balls and to avoid pushing the balls back and forth by the pressure of said oil.

A short cylinder 80 is positioned at the rear of the piston 55 for reciprocation of the rear end of said piston therein, said cylinder 80 being secured as by means of pins to radially disposed webs 82 carried by the casing 30. The webs 82 are slightly undercut as indicated at 83 to a point somewhat forward of the rear edge of the cylinder 80 for cooperation with the annular oil controlling sleeve 84 of the valve. The forward edge of said sleeve 84 is adapted to engage with the rear edge of the cylinder 80 to limit the flow of oil and, as the diameter of said sleeve 84 is slightly greater than that of the cylinder 80 an overhanging edge will gradually form on the sleeve 84 which may enter the undercut spaces 83. The sleeve valve 84 is carried by the sleeve 40 which slides on the shaft 46, said sleeve 40 also carrying a cylindrical member 85 reciprocable on a packing nut 86 threaded upon the shaft 46 which retains packing material 88 against retaining members 91 for ball bearings 90. The packing material 88 effectually prevents the movement of any material amount of oil outward between sleeve 40 and shaft 46. The sleeve valve 84 reciprocates within the rear end of the casing 30, and packing material 92 is retained thereon by means of a packing ring 94. A plurality of oil passages 95 are drilled through the hub of the valve sleeve 84 to permit the passage of oil from front to rear thereof. The internal diameter of the cylindrical member 85 is the same as the external diameter of the body portion of the valve sleeve 40 so that the distance between the outer walls of valve sleeve 40 and the inner wall of casing 30 is equal to the distance between the inner wall of cylindrical member 85 and the outer wall of the sleeve valve 84. This offset relation of the cylindrical member 85 with respect to the sleeve 40 thus brings about a condition wherein the displacement of oil at the forward end of the valve member as a whole, is exactly equal to the displacement at the rear thereof. In this manner there is no change in capacity of the oil chamber as a result of movement of the valve.

In order to care for expansion of oil, due to temperature changes, a yielding corrugated spring casing 96 is positioned at the rear of the casing 30, communication being had with the interior of the casing by means of port 98, and a similar expansible spring chamber 100 is provided at the forward end of the casing 30, communication being had by means of passages 99. These casings 96 and 100 are so constructed as to expand when pressure becomes excessive under temperature change but not sufficiently yieldable to interfere with the operation of the device.

Assuming that the clutch is connected to an automobile engine, the valve 84 is withdrawn to open position as indicated in Fig. 2 to permit the engine to idle. In this position as the shaft 10 rotates, the head 24 and the casing 30, the rollers 65 and 66 traveling in the groove 56 will cause the piston 55 to reciprocate upon the shaft 46. As the valve member 84 is gradually closed the movement of oil from one end of the piston to the other will be gradually retarded so that a portion of the rotary motion of the casing 30 will be transmitted by engagement of the rollers 65 and 66 with the piston 55, to the shaft 46 and thereby drive said shaft 46. When the sleeve valve 84 is moved entirely to closed position as shown at Fig. 1 no oil will be permitted to travel from one end of the piston to the other thereby locking the piston in a given position on shaft 46 and thereby causing the shaft 46 to be driven at the same rate as shaft 10 and casing 30. Since engagement of rollers with opposite sides of a cam groove tends to produce rotation in opposite directions, the provision of the two rollers 65 and 66 and the provision of the faces 58 and 60 at different heights permits the rollers 65 and 66 to rotate in opposite directions independently of one another thereby eliminating excessive wear which results where a single roller travels in a cam groove between directly opposite faces.

Whatever wear of the rollers 65 and 66 occurs, may be taken up by removal of one or more of the shims 71 and the adjustment of the nut 72. Also, wear between the rollers and their ball bearings may be taken up by means of the threaded connections between the stem 68 and the sleeve 70 and between the sleeve 70 and the nut 72 in connection with the locking nuts 73.

In addition to the features specially pointed out above, it is desired to call attention to a number of other points in particular. One of the most important is the construction which permits rapid movement of the oil from one side of the piston to the other so as to eliminate practically all friction. This result is brought about by the use of the short sleeve 80, in the making of the cam groove 56 as deep and wide as possible and the provision of the large apertures 64 in the upstanding wall 62. This construction of the groove and provision of the apertures 64 also materially lightens the weight of the piston. In this manner as much clearance may be provided between the casing 30 and the cylinder 80 as is desired in order that the oil may pass quickly around said cylinder 80 when the valve 84 is open. This construction also permits making the casing 30 much shorter than has heretofore been possible in devices of this class, the result being a much more efficient clutch.

When the controlling valve 84 is open and occupies the position shown in Fig. 2, oil may pass from the chamber formed by the face of the bearing block 52 and the piston through openings 64 and through space between upstanding wall 62 and member 30 into the cam groove 56 through the passages in member 30 between the webs 82 to the rear of the piston and vice versa.

The special construction of the flanges 78 wherein the fingers which project into the grooves are beveled off as shown in Fig. 1, permits making a tight fit of said fingers in the grooves initially, any undue projection of the sharp edges of the fingers being soon worn away during operation to produce an even, close and efficient closure of the grooves.

The use of a single valve operating member in the form of the sleeve or cylindrical stem 40 is also important as compared with a plurality of separate fingers disposed around the shaft 46, because the construction shown does not permit of any lateral twisting or binding and consequent interference with uniform movement of the valve. It will also be noted that the vent 50 which is on the upper side of the valve sleeve or stem 40 permits the passage of air to and from the space between the shaft 46 and the sleeve 40 as the latter is operated.

In employing the stationary member 20 as a brake, the faces 16 and 18 will be driven into tight engagement while the valve 84 is open and then the valve 84 will be gradually closed in order to lock the parts within the casing and the casing against relative rotation. In this manner the wear on the faces 16 and 18 is less than between such faces as used in present practice, but under excessive load, they will slip and protect the machine from injury. Similarly, in driving the machine, the clutch face 15 may be driven into tight engagement with the clutch on the engine shaft while the valve 84 is wide open, the movement of the machine being controlled entirely by manipulation of the valve 84 without slipping of the clutch parts mentioned as has been done with ordinary clutches heretofore.

Particular attention is also called to the fact that by reason of the beveled walls 58 and 60 and the tapered or frusto-conical construction of the rollers 65 and 66, said rollers may be readily adjusted inward to take up any wear of said rollers or of the walls 58 and 60 upon which said rollers travel.

I claim:

1. In an oil clutch a rotary casing, a reciprocable piston in said casing, said piston having a cam groove, the wall on one side of the groove being higher than that on the other side, said high wall having apertures therethru whereby oil may pass from the adjacent end of the piston to said groove and over said low wall to the opposite end of the piston, and rollers carried by said casing to engage said cam walls respectively.

2. In an oil clutch, a rotary casing, a short cylinder secured in said casing to permit the passage of oil between the cylinder and the casing, a piston a portion of which is reciprocable in said cylinder, said piston having a cam groove therein having a low wall on the cylinder side and a high wall on the opposite side, and rollers projecting into said groove and respectively engaging the walls thereof.

3. In an oil clutch, a rotary casing, a short cylinder secured in said casing to permit the passage of oil between the cylinder and the casing, a piston a portion of which is reciprocable in said cylinder, said piston having a cam groove therein having a low wall on the cylinder side and a high wall on the opposite side, said high wall having apertures therethru whereby oil may pass from the adjacent end of the piston to said groove and over said low wall to the opposite end of the piston, and rollers carried by said casing to engage said cam walls respectively.

4. In an oil clutch, a rotary casing, a head on said casing, a shaft secured to said head, a second shaft extending into said casing and having its inner end journaled on said head, a reciprocable piston splined on said second shaft and having a cam groove therein, guiding means mounted in said casing and engaging said groove to control the reciprocation of the piston, a cylindrical sleeve secured to said casing, adapted to cooperate with said piston, passageways on the outside of said sleeve and means for controlling the passage of oil from one end of the piston to the other through said pasageways.

5. In an oil clutch, a rotary casing, a head on said casing, a shaft secured to said head, a second shaft extending into said casing and having its inner end journaled on said head, a reciprocable piston splined on said second shaft and having a cam groove therein, guiding means mounted in said casing and engaging said groove to control the reciprocation of the piston, means comprising a valve member slidable on said second shaft for controlling the passage of oil from one end of the piston to the other, a clutch member splined on one of said shafts without the casing and adapted to be engaged with an engine clutch, and a stationary braking element also adapted to be engaged by said clutch member.

6. In an oil clutch, a rotary casing, a head on said casing, a shaft secured to said head, a second shaft extending into said casing and having its inner end journaled on said head, a reciprocable piston splined on said second shaft and having a cam groove therein, guiding means mounted in said casing and engaging said groove to control the reciprocation of the piston, means for controlling the passage of oil from one end of the piston to the other, a second head on said casing, journaling means for both of said heads, and a sleeve slidable upon said second shaft and carrying said controlling means, said second shaft being journaled in said sleeve and said sleeve being journaled in said second head.

7. In an oil clutch, a rotary casing, a head on said casing, a shaft secured to said head, a second shaft extending into said casing and having its inner end journaled on said head, a reciprocable piston splined on said second shaft and having a cam groove therein, guiding means mounted in said casing and engaging said groove to control the reciprocation of the piston, means for controlling the passage of oil from one end of the piston to the other, a second head on said casing, journaling means for both of said heads, a sleeve slidable upon said second shaft and carrying said controlling means, said second shaft being journaled in said sleeve and said sleeve being journaled in said second head, said controlling means comprising a sleeve valve offset an amount to compensate for the thickness of said sleeve, the space behind the offset being in communication with the piston cavity within the casing.

8. In an oil clutch, a rotary casing, a head on said casing, a shaft secured to said head, a second shaft extending into said casing and having its inner end journaled on said head, a reciprocable piston splined on said second shaft and having a cam groove therein, guiding means mounted in said casing and engaging said groove to control the reciprocation of the piston, means for controlling the passage of oil from one end of the piston to the other, a clutch member splined on one of said shafts without the casing and adapted to be engaged with an engine clutch, a stationary braking element also adapted to be engaged by said clutch member, and yielding means surrounding a portion of each end of said casing to take up excessive pressure within the casing.

9. In an oil clutch, a rotary casing, a head on said casing, a shaft secured to said head, a second shaft extending into said casing and having its inner end journaled on said head, a reciprocable piston splined on said second shaft and having a cam groove therein, guiding means mounted in said casing and engaging said groove to control the reciprocation of the piston, means for controlling the passage of oil from one end of the piston to the other, a clutch member splined on one of said shafts without the casing and adapted to be engaged with an engine clutch, a stationary braking element also adapted to be engaged by said clutch member, and yielding means connected with said casing to take up excessive pressure within the casing, said means comprising an expansible container adapted to receive oil and secured to outer walls of said casing.

10. An oil clutch comprising a casing, a shaft extending into said casing, a piston within said casing reciprocable on said shaft and splined to said shaft, said shaft and piston having grooves therein and balls positioned in said grooves and constituting the splining means, said balls being arranged in two series of rows, the balls of engagement of the rollers 65 and 66 with the piston 55, to the shaft 46 and thereby drive said shaft 46. When the sleeve valve 84 is moved entirely to closed position as shown at Fig. 1 no oil will be permitted to travel from one end of the piston to the other thereby locking the piston in a given position on shaft 46 and thereby causing the shaft 46 to be driven at the same rate as shaft 10 and casing 30. Since engagement of rollers with opposite sides of a cam groove tends to produce rotation in opposite directions, the provision of the two rollers 65 and 66 and the provision of the faces 58 and 60 at different heights permits the rollers 65 and 66 to rotate in opposite directions independently of one another thereby eliminating excessive wear which results where a single roller travels in a cam groove between directly opposite faces.

Whatever wear of the rollers 65 and 66 occurs, may be taken up by removal of one or more of the shims 71 and the adjustment of the nut 72. Also, wear between the rollers and their ball bearings may be taken up by means of the threaded connections between the stem 68 and the sleeve 70 and between the sleeve 70 and the nut 72 in connection with the locking nuts 73.

In addition to the features specially pointed out above, it is desired to call attention to a number of other points in particular. One of the most important is the construction which permits rapid movement of the oil from one side of the piston to the other so as to eliminate practically all friction. This result is brought about by the use of the short sleeve 80, in the making of the cam groove 56 as deep and wide as possible and the provision of the large apertures 64 in the upstanding wall 62. This construction of the groove and provision of the apertures 64 also materially lightens the weight of the piston. In this manner as much clearance may be provided between the casing 30 and the cylinder 80 as is desired in order that the oil may pass quickly around said cylinder 80 when the valve 84 is open. This construction also permits making the casing 30 much shorter than has heretofore been possible in devices of this class, the result being a much more efficient clutch.

When the controlling valve 84 is open and occupies the position shown in Fig. 2, oil may pass from the chamber formed by the face of the bearing block 52 and the piston through openings 64 and through space between upstanding wall 62 and member 30 into the cam groove 56 through the passages in member 30 between the webs 82 to the rear of the piston and vice versa.

The special construction of the flanges 78 wherein the fingers which project into the grooves are beveled off as shown in Fig. 1, permits making a tight fit of said fingers in the grooves initially, any undue projection of the sharp edges of the fingers being soon worn away during operation to produce an even, close and efficient closure of the grooves.

The use of a single valve operating member in the form of the sleeve or cylindrical stem 40 is also important as compared with a plurality of separate fingers disposed around the shaft 46, because the construction shown does not permit of any lateral twisting or binding and consequent interference with uniform movement of the valve. It will also be noted that the vent 50 which is on the upper side of the valve sleeve or stem 40 permits the passage of air to and from the space between the shaft 46 and the sleeve 40 as the latter is operated.

In employing the stationary member 20 as a brake, the faces 16 and 18 will be driven into tight engagement while the valve 84 is open and then the valve 84 will be gradually closed in order to lock the parts within the casing and the casing against relative rotation. In this manner the wear on the faces 16 and 18 is less than between such faces as used in present practice, but under excessive load, they will slip and protect the machine from injury. Similarly, in driving the machine, the clutch face 15 may be driven into tight engagement with the clutch on the engine shaft while the valve 84 is wide open, the movement of the machine being controlled entirely by manipulation of the valve 84 without slipping of the clutch parts mentioned as has been done with ordinary clutches heretofore.

Particular attention is also called to the fact that by reason of the beveled walls 58 and 60 and the tapered or frusto-conical construction of the rollers 65 and 66, said rollers may be readily adjusted inward to take up any wear of said rollers or of the walls 58 and 60 upon which said rollers travel.

I claim:

1. In an oil clutch a rotary casing, a reciprocable piston in said casing, said piston having a cam groove, the wall on one side of the groove being higher than that on the other side, said high wall having apertures therethru whereby oil may pass from the adjacent end of the piston to said groove and over said low wall to the opposite end of the piston, and rollers carried by said casing to engage said cam walls respectively.

2. In an oil clutch, a rotary casing, a short cylinder secured in said casing to permit the passage of oil between the cylinder and the casing, a piston a portion of which is reciprocable in said cylinder, said piston having a cam groove therein having a low wall on the cylinder side and a high wall on the opposite side, and rollers projecting into said groove and respectively engaging the walls thereof.

3. In an oil clutch, a rotary casing, a short cylinder secured in said casing to permit the passage of oil between the cylinder and the casing, a piston a portion of which is reciprocable in said cylinder, said piston having a cam groove therein having a low wall on the cylinder side and a high wall on the opposite side, said high wall having apertures therethru whereby oil may pass from the adjacent end of the piston to said groove and over said low wall to the opposite end of the piston, and rollers carried by said casing to engage said cam walls respectively.

4. In an oil clutch, a rotary casing, a head on said casing, a shaft secured to said head, a second shaft extending into said casing and having its inner end journaled on said head, a reciprocable piston splined on said second shaft and having a cam groove therein, guiding means mounted in said casing and engaging said groove to control the reciprocation of the piston, a cylindrical sleeve secured to said casing, adapted to cooperate with said piston, passageways on the outside of said sleeve and means for controlling the passage of oil from one end of the piston to the other through said pasageways.

5. In an oil clutch, a rotary casing, a head on said casing, a shaft secured to said head, a second shaft extending into said casing and having its inner end journaled on said head, a reciprocable piston splined on said second shaft and having a cam groove therein, guiding means mounted in said casing and engaging said groove to control the reciprocation of the piston, means comprising a valve member slidable on said second shaft for controlling the passage of oil from one end of the piston to the other, a clutch member splined on one of said shafts without the casing and adapted to be engaged with an engine clutch, and a stationary braking element also adapted to be engaged by said clutch member.

6. In an oil clutch, a rotary casing, a head on said casing, a shaft secured to said head, a second shaft extending into said casing and having its inner end journaled on said head, a reciprocable piston splined on said second shaft and having a cam groove therein, guiding means mounted in said casing and engaging said groove to control the reciprocation of the piston, means for controlling the passage of oil from one end of the piston to the other, a second head on said casing, journaling means for both of said heads, and a sleeve slidable upon said second shaft and carrying said controlling means, said second shaft being journaled in said sleeve and said sleeve being journaled in said second head.

7. In an oil clutch, a rotary casing, a head on said casing, a shaft secured to said head, a second shaft extending into said casing and having its inner end journaled on said head, a reciprocable piston splined on said second shaft and having a cam groove therein, guiding means mounted in said casing and engaging said groove to control the reciprocation of the piston, means for controlling the passage of oil from one end of the piston to the other, a second head on said casing, journaling means for both of said heads, a sleeve slidable upon said second shaft and carrying said controlling means, said second shaft being journaled in said sleeve and said sleeve being journaled in said second head, said controlling means comprising a sleeve valve offset an amount to compensate for the thickness of said sleeve, the space behind the offset being in communication with the piston cavity within the casing.

8. In an oil clutch, a rotary casing, a head on said casing, a shaft secured to said head, a second shaft extending into said casing and having its inner end journaled on said head, a reciprocable piston splined on said second shaft and having a cam groove therein, guiding means mounted in said casing and engaging said groove to control the reciprocation of the piston, means for controlling the passage of oil from one end of the piston to the other, a clutch member splined on one of said shafts without the casing and adapted to be engaged with an engine clutch, a stationary braking element also adapted to be engaged by said clutch member, and yielding means surrounding a portion of each end of said casing to take up excessive pressure within the casing.

9. In an oil clutch, a rotary casing, a head on said casing, a shaft secured to said head, a second shaft extending into said casing and having its inner end journaled on said head, a reciprocable piston splined on said second shaft and having a cam groove therein, guiding means mounted in said casing and engaging said groove to control the reciprocation of the piston, means for controlling the passage of oil from one end of the piston to the other, a clutch member splined on one of said shafts without the casing and adapted to be engaged with an engine clutch, a stationary braking element also adapted to be engaged by said clutch member, and yielding means connected with said casing to take up excessive pressure within the casing, said means comprising an expansible container adapted to receive oil and secured to outer walls of said casing.

10. An oil clutch comprising a casing, a shaft extending into said casing, a piston within said casing reciprocable on said shaft and splined to said shaft, said shaft and piston having grooves therein and balls positioned in said grooves and constituting the splining means, said balls being arranged in two series of rows, the balls of one series being in engagement with the sides of the respective grooves and the balls of the other series being in engagement with the bottoms of the grooves.

11. An oil clutch comprising a casing, a shaft extending into said casing, a piston within said casing reciprocable on said shaft and splined to said shaft, said shaft and piston having grooves therein, balls positioned in said grooves and constituting the splining means, and fingers carried by the piston and projecting into and closing said grooves to prevent passage of oil through said grooves.

12. An oil clutch comprising a casing, a shaft extending into said casing, a piston within said casing reciprocable on said shaft and splined to said shaft, said shaft and piston having grooves therein, balls positioned in said grooves and constituting the splining means, and a cylindrical member disposed about said shaft and having sockets in which said balls are retained, said member comprising a pair of opposed cylinders having oppositely struck ball engaging wings forming said sockets.

13. In combination, a shaft, a reciprocable member on said shaft, said shaft and member having grooves therein, and balls mounted in said grooves and constituting splining means, said balls being arranged in two series of rows, the balls of one series being in engagement with the sides of the respective grooves and the balls of the other series being in engagement with the bottoms of the grooves.

14. In an oil clutch, a rotary casing, a head on said casing, a shaft secured to said head, a second shaft extending into said casing and having its inner end journaled on said head, a reciprocable piston splined on said second shaft and having a cam groove therein, guiding means mounted in said casing and engaging said groove to control the reciprocation of the piston, means for controlling the passage of oil from one end of the piston to the other, and yielding means connected with said casing and surrounding a portion of each end thereof to take up excessive pressure within the casing.

15. In an oil clutch, a rotary casing, a head on said casing, a shaft secured to said head, a second shaft extending into said casing and having its inner end journaled on said head, a reciprocable piston splined on said second shaft and having a cam groove therein, guiding means mounted in said casing and engaging said groove to control the reciprocation of the piston, means for controlling the passage of oil from one end of the piston to the other, and yielding means connected with said casing to take up excessive pressure within the casing, said means comprising an expansible container adapted to receive oil and secured to outer walls of said casing.

16. A piston having a beveled cam groove, the walls of one side of the groove being higher than those on the other side, a pair of beveled rollers respectively engaging said walls, and means by which said rollers are carried comprising an adjustable sleeve on which one roller is journaled, and a pin adjustable in said sleeve on which the other roller is journaled.

17. A piston having a beveled cam groove, the walls of one side of the groove being higher than those on the other side, a pair of beveled rollers respectively engaging said walls, a relatively stationary member supporting said rollers, a sleeve adjustable in said member and on which one roller is journaled, and a pin adjustable in the sleeve and on which the other roller is journaled.

18. A piston having a beveled cam groove, the walls of one side of the groove being higher than those on the other side, a pair of beveled rollers respectively engaging said walls, a relatively stationary member supporting said rollers, a sleeve adjustable in said member and on which one roller is journaled, and a pin adjustable in the sleeve and on which the other roller is journaled, said member being itself bodily adjustable.

19. In a liquid clutch, a casing, a shaft, a hollow valve stem in the casing through which the shaft passes and a packing nut on the shaft of the same diameter as the outside diameter of said stem.

20. In an oil clutch, a rotary casing, a short cylinder secured in said casing to permit the passage of oil between the cylinder and the casing, a piston, a portion of which is reciprocable in said cylinder, said piston having a cam groove therein, and rollers projecting into said groove and respectively engaging the walls thereof.

21. In a liquid clutch, in combination a casing, a piston within said casing, a shaft upon which said piston reciprocates and a valve, said valve surrounding said shaft and having near one end thereof a ball bearing for the shaft.

22. In a liquid clutch, in combination a casing, a piston within said casing, a shaft upon which said piston reciprocates, a valve surrounding said shaft, a ball bearing near one end of the valve and cooperating with the shaft, and an air vent into the space between the shaft and the inside of the valve.

23. In combination a casing adapted to contain a liquid, one end of said casing being imperforate, a piston slidably mounted in said casing, said piston and casing having a fluid-tight joint, passages from one end of said casing to the other whereby the liquid, displaced by the piston, will flow from one end to the other, a shaft entering the casing, said piston being slidable on said shaft, a valve surrounding the shaft and provided with means for controlling said passages, means for reciprocating said valve into and out of said casing, and means whereby the reciprocation of the valve in the casing does not alter the cubical contents thereof.

24. A closed casing, a shaft entering the space therein, a valve member surrounding the shaft and having a portion thereof inside and another portion outside of the casing, means for reciprocating said valve in said casing, and means for maintaining the cubical contents of the casing constant, regardless of the position of the valve.

25. A liquid clutch comprising a cylinder adapted to rotate, a rotatable shaft extending within said cylinder, a piston non-rotatably but slidably mounted on the shaft, the cylinder having a passage connecting the cylinder spaces at opposite ends of the piston, a valve concentrically mounted on said shaft and slidable therealong for controlling said passage, and means on the cylinder and on the piston cooperating to cause rotation of the piston with the cylinder when the valve is closed and to permit the piston to slide on the shaft when the valve is open.

26. A liquid clutch comprising a cylinder adapted to rotate, a rotatable shaft extending within said cylinder, a piston non-rotatably and slidably mounted on the shaft, the cylinder having a passage connecting the cylinder spaces at opposite ends of the piston, a valve controlling said passage and slidably mounted on said shaft, a pair of studs fixed in the cylinder and projecting therewithin and movable in cut-away portions of the piston to cause rotation of the piston with the cylinder when the valve is closed and to permit the piston to slide on the shaft when the valve is open.

27. A liquid clutch comprising a cylinder adapted to rotate, a rotatable shaft extending within said cylinder, a piston non-rotatably but slidably mounted on the shaft, the cylinder having a passage connecting the cylinder spaces at opposite ends of the piston, a valve mounted upon and slidable along said shaft for controlling said passage, and means on the cylinder and on the piston cooperating to cause rotation of the piston with the cylinder.

In testimony whereof I affix my signature.

JOHN A. MALM.